(12) United States Patent
Gallo (10) Patent No.: US 8,783,722 B1
(45) Date of Patent: Jul. 22, 2014

(54) SELF-RELEASING VEHICULAR HARNESS

(71) Applicant: Gerald F. Gallo, Worcester, MA (US)

(72) Inventor: Gerald F. Gallo, Worcester, MA (US)

( * ) Notice: Subject to any disclaimer, the term of this patent is extended or adjusted under 35 U.S.C. 154(b) by 0 days.

(21) Appl. No.: 13/732,593

(22) Filed: Jan. 2, 2013

(51) Int. Cl.
*B60R 22/32* (2006.01)

(52) U.S. Cl.
CPC .................................. *B60R 22/321* (2013.01)
USPC ........ 280/801.1; 180/268; 180/273; 280/806; 280/807

(58) Field of Classification Search
USPC ........... 280/288.4, 290, 733, 801.1, 807, 806; 180/268, 271, 273
See application file for complete search history.

(56) References Cited

U.S. PATENT DOCUMENTS

| 635,683 | A | * | 10/1899 | Herman ......................... 280/290 |
| 4,037,683 | A | | 7/1977 | Lebell |
| 4,059,852 | A | | 11/1977 | Crane |
| 4,311,335 | A | * | 1/1982 | Winiecki ...................... 296/78.1 |
| 4,327,931 | A | * | 5/1982 | Winiecki ........................ 280/295 |
| 4,416,465 | A | * | 11/1983 | Winiecki ........................ 280/290 |
| 4,641,723 | A | * | 2/1987 | Takanashi et al. ............. 180/315 |
| 4,825,469 | A | | 5/1989 | Kincheloe |
| 5,593,111 | A | | 1/1997 | Jackson et al. |
| D385,852 | S | | 11/1997 | Pingel et al. |
| 5,746,442 | A | * | 5/1998 | Hoyaukin ................... 280/730.1 |
| 6,125,478 | A | | 10/2000 | Alaloof |
| 6,679,550 | B2 | * | 1/2004 | Goor et al. ................. 297/216.11 |
| 6,793,033 | B2 | * | 9/2004 | Yamazaki et al. ............ 180/268 |
| 7,370,887 | B2 | * | 5/2008 | Matsuo .......................... 280/804 |
| 7,445,235 | B2 | | 11/2008 | Makabe et al. |
| 7,516,980 | B2 | | 4/2009 | Kobayashi et al. |
| 7,796,021 | B2 | * | 9/2010 | Saban ............................ 340/438 |
| 8,087,694 | B2 | * | 1/2012 | Johnson et al. ............... 280/756 |
| 8,353,534 | B2 | * | 1/2013 | Arnold et al. ............... 280/801.1 |
| 2001/0002087 | A1 | * | 5/2001 | Townsend ................... 280/801.1 |
| 2003/0001378 | A1 | * | 1/2003 | Kim et al. ................... 280/801.1 |
| 2003/0230886 | A1 | * | 12/2003 | Yamazaki et al. .......... 280/801.1 |
| 2004/0045757 | A1 | * | 3/2004 | Midorikawa et al. ......... 180/268 |
| 2006/0061198 | A1 | * | 3/2006 | Squires et al. ................. 297/466 |
| 2006/0125206 | A1 | * | 6/2006 | Goto et al. ..................... 280/290 |
| 2006/0225943 | A1 | * | 10/2006 | Squires et al. ................. 180/371 |
| 2007/0069507 | A1 | * | 3/2007 | Kobayashi et al. ........... 280/733 |
| 2009/0102271 | A1 | * | 4/2009 | Squires et al. ................. 297/477 |
| 2011/0061637 | A1 | * | 3/2011 | Mavinahally et al. ...... 123/65 R |
| 2011/0062690 | A1 | * | 3/2011 | Kizaki ........................... 280/735 |
| 2011/0148088 | A1 | * | 6/2011 | Arnold et al. ................. 280/807 |
| 2011/0154561 | A1 | | 6/2011 | Singhal |

* cited by examiner

*Primary Examiner* — Paul N Dickson
*Assistant Examiner* — Barry Gooden, Jr.
(74) *Attorney, Agent, or Firm* — Kyle A. Fletcher, Esq.

(57) ABSTRACT

The self-releasing vehicular harness is a harness designed to prevent a driver or rider of a motorcycle from flying over the handlebars during a head-on or upright collision. The self-releasing vehicular harness includes a tether that extends from the harness to a spring-loaded drum located in a housing positioned to the rear of the end user. The housing contains at least one tensioning means that releases the drum in order to enable the tether to unroll thereby releasing the end user from the vehicle in the event of a non-head-on collision or other parameter. An inclinometer detects the angle of the vehicle in order to determine whether to release or lock the spring-loaded drum. A kill switch and/or seat sensor may work in conjunction with the inclinometer to further define parameters for releasing or locking the tether.

11 Claims, 7 Drawing Sheets

SELF-RELEASING VEHICULAR HARNESS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of motorized vehicles, more specifically, a safety harness for use with said vehicle, which is self-releasing.

Riding a motorcycle can be dangerous where the conditions are wet or where other motorists aren't vigilant for other motorists. Unfortunately, individuals that have accidents while riding motorcycles are often seriously injured or worse. In the event of a head-on accident while driving or riding a motorcycle, the occupant(s) would travel over the handlebars and either into the corresponding crash vehicle or other object.

What is needed is a device that includes a harness that attaches onto a driver or occupant of a motorcycle, which restrains the individual during a front-on impact in order to prevent said end user from flying over the handlebars and into another vehicle or into another object. A further need is to enable the harness to automatically release itself in the event that the end user and motorcycle are at an acute angle with respect to the ground, which may occur where the motorcycle is sliding. The device of the present application addresses this need along with many others.

B. Discussion of the Prior Art

As will be discussed immediately below, no prior art discloses a self-releasing vehicular harness that is adapted for use with a motorcycle/four-wheeler/jet ski/snowmobile, etc., and which restrains the driver or rider in order to prevent said end user from flying over top of the handlebars during a head-on collision with another vehicle or object; wherein the self-releasing vehicular harness includes a tether that extends from the harness to a spring-loaded drum located in a housing positioned to the rear or to a side of the end user; wherein the housing contains at least one tensioning means that releases the drum in order to enable the tether to unroll thereby releasing the end user from the vehicle in the event of a non-head-on collision or non-upright collision; wherein an inclinometer detects the angle of the vehicle in order to determine whether to release or lock the spring-loaded drum; wherein a kill switch and/or seat sensor may work in conjunction with the inclinometer to further define parameters for releasing or locking the tether.

The Makabe et al. Patent (U.S. Pat. No. 7,445,235) discloses an air bag device that is used as a device that attenuates an impact to a rider of a motorcycle or the like which includes an inclination sensor for detecting an inclination of the vehicle, and an angle acceleration calculating part for calculating the inclination angle acceleration of the vehicle body.

The Kobayashi et al. Patent (U.S. Pat. No. 7,516,980) discloses a rider separation detecting device for a motorcycle. However, the device does not release the harness completely, and inflates a garment when conditions are met.

The Crane Patent (U.S. Pat. No. 4,059,352) discloses a protective garment for minimizing impact-caused injury, primarily to the body of a motorcyclist. However, the garment includes a harness that is unable to automatically release itself from the motorcycle in the event that the rider or driver and motorcycle have leaned to one side.

The Alaloof Patent (U.S. Pat. No. 6,125,478) discloses a protective system including a garment-shaped inflatable member for surrounding at least the upper portions of the body of a rider of a non-enclosed vehicle. However, the garment relies upon inflation to occur while the driver or rider is flying through the air as a direct result of a head-on collision with a motorcycle.

The Singhal Patent Application Publication (U.S. Pub. No. 2011/0154561) discloses a motorcycle rider safety harness that is suitable to be worn by a motorcycle rider. However, the harness includes a plurality of air bags that deploy in conjunction therewith, and is not adapted to restrain a rider or driver from falling over the handlebars of a motorcycle during a head-on collision.

The Jackson Patent (U.S. Pat. No. 5,593,111) discloses a safety system for removing a rider from a vehicle by deploying a parachute. However, the parachute is not a harness that restrains a rider or driver from travfeling over the handlebars during head-on collision.

The Kincheloe Patent (U.S. Pat. No. 4,825,469) discloses an inflatable protective apparel for motorcycle riders, and the like. However, the protective apparel does not restrain a rider onto a motorcycle in order to prevent the occupant from falling over the handlebars during a head-on collision.

The LeBell Patent (U.S. Pat. No. 4,037,663) discloses a safety cut-out switch for a motor-vehicle ignition system. However, the switch does not restrain the motorist or passenger from traveling over the handlebars during a head-on collision while on a motorcycle.

The Pingel et al. Patent (U.S. Pat. No. Des. 385,852) illustrates an ornamental design for a motorcycle ignition Kill switch. However, the kill switch does not work in conjunction with a harness.

While the above-described devices fulfill their respective and particular objects and requirements, they do not describe a self-releasing vehicular harness that is adapted for use with a motorcycle/four-wheeler/jet ski/snowmobile, etc., and which restrains the driver or rider in order to prevent said end user from flying over top of the handlebars during a head-on collision with another vehicle or object; wherein the self-releasing vehicular harness includes a tether that extends from the harness to a spring-loaded drum located in a housing positioned to the rear or to a side of the end user; wherein the housing contains at least one tensioning means that releases the drum in order to enable the tether to unroll thereby releasing the end user from the vehicle in the event of a non-head-on collision or non-upright collision; wherein an inclinometer detects the angle of the vehicle in order to determine whether to release or lock the spring-loaded drum; wherein a kill switch and/or seat sensor may work in conjunction with the inclinometer to further define parameters for releasing or locking the tether. In this regard, the self-releasing vehicular harness departs from the conventional concepts and designs of the prior art.

SUMMARY OF THE INVENTION

The self-releasing vehicular harness is a harness designed to prevent a driver or rider of a motorcycle from flying over the handlebars during a head-on or vertical collision. The self-releasing vehicular harness that is adapted for use with a motorcycle, moped, four-wheeler, jet; ski, snow mobile, or similar type of vehicle, and which restrains the driver or rider in order to prevent said end user from flying over top of the handlebars during a head-on or vertical collision with another vehicle or object. The self-releasing vehicular harness includes a tether that extends from the harness to a spring-loaded drum located in a housing positioned to the rear or to a side of the end user. The housing contains at least one tensioning means that releases the drum in order to enable the tether to unroll thereby releasing the end user from the vehicle in the event of a non-head-on collision or other parameter. An inclinometer detects the angle of the vehicle in order to determine whether to release or lock the spring-loaded drum. A kill switch and/or seat sensor may work in conjunction with the inclinometer to further define parameters for releasing or locking the tether.

It is an object of the invention to provide a harness that restrains a driver from flying over top of the handlebars during a head-on or upright collision with another vehicle or object.

A further object of the invention is to provide a harness that is able to restrain a driver or a rider from flying over the handlebars during a head-on or upright collision.

A further object of the invention is to provide a harness that is either integrated into the design of a new vehicle or is able to be installed onto an existing vehicle A further object of the invention is to provide a harness that is positioned immediately behind or to a side of the end user and from which a tether extends from the harness to a spring-loaded drum that will either release the tether or lock the tether depending upon a number of parameters.

Another object of the invention is to include a seat sensor that works in conjunction or separately with an inclinometer to either lock or release the tether when sensing an end user seated or not seated on the seat and/or the lateral and/or longitudinal angle of the vehicle.

Another object of the invention is to provide a kill switch that can be manually used to release the tether.

These together with additional objects, features and advantages of the self-releasing vehicular harness will be readily apparent to those of ordinary skill in the art upon reading the following detailed description of presently preferred, but nonetheless illustrative, embodiments of the self-releasing vehicular harness* when taken in conjunction with the accompanying drawings.

In this respect, before explaining the current embodiments of the self-releasing vehicular harness in detail, it is to be understood that the self-releasing vehicular harness is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the self-releasing vehicular harness.

It is therefore important that the claims be regarded as including such equivalent construction insofar as they do not depart from the spirit and scope of the self-releasing vehicular harness. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-12. A self-releasing vehicular harness 100 (hereinafter invention) includes a harness 101 that is rigidly affixed to a tether 102 of an undefined length. The tether 102 is made of a flexible material and may be in the form of a nylon webbing or metal cable that is able to be rolled upon a spring-loaded drum 103.

The spring-loaded drum 103 provides a manner of roiling the tether 102 up within a housing 110. The spring-loaded drum 103 is the component of the invention 100 that locks or releases the tether 102 thereby restraining or not restraining an end user 200 with respect to a vehicle 300 during a head-on or upright collision. It shall be noted that the term vehicle 300 can be used to cover motorcycles, jet skis, snowmobiles, mopeds, or four wheelers, etc.

The spring-loaded drum 103 connects to the housing 110 via a solenoid 120. The housing 110 being of hollowed construction includes an opening 111 to enable the tether 102 to extend therefrom. The solenoid 120 either locks or unlocks the spring-loaded drum 103 to either restrain or not restrain the end user 200. The housing 110 being positioned behind the end user 200 shall be either installed onto an existing motorcycle or integrated into the design of a new motorcycle (note FIGS. 4-5). The solenoid 120 is rotatably engaged with the housing 110 via a hinge 121 positioned there between and inside of the housing 110.

Figure 1:
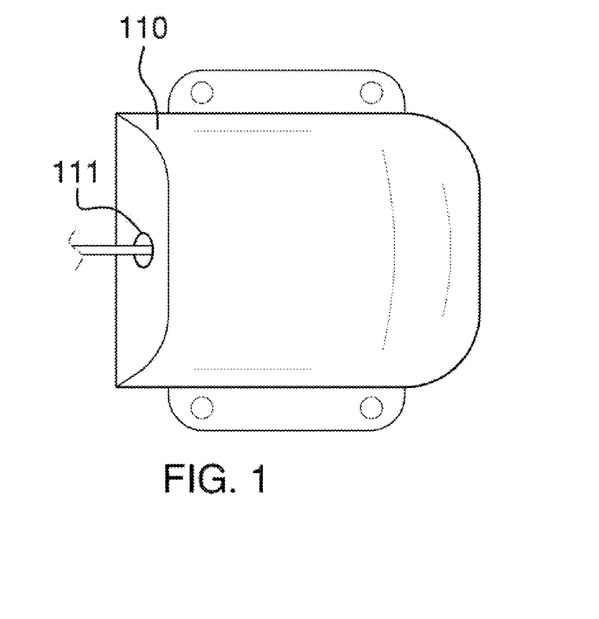
FIG. 1 illustrates a top view of the housing with the tether extending therefrom.
Figure 2:
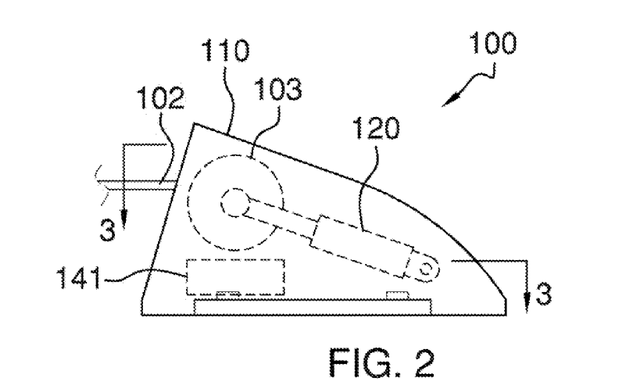
FIG. 2 illustrates a side view of the housing depicting the location of the various components associated with the self-releasing vehicular harness.
Figure 3:
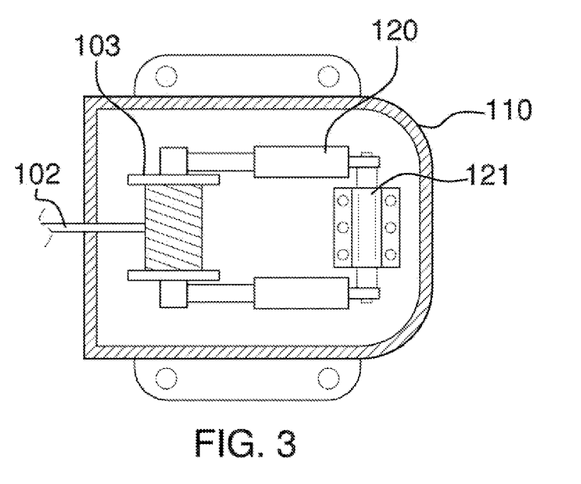
FIG. 3 illustrates a cross-sectional view along line 3-3 in FIG. 2 depicting the drum and solenoid arranged within.
Figure 4:
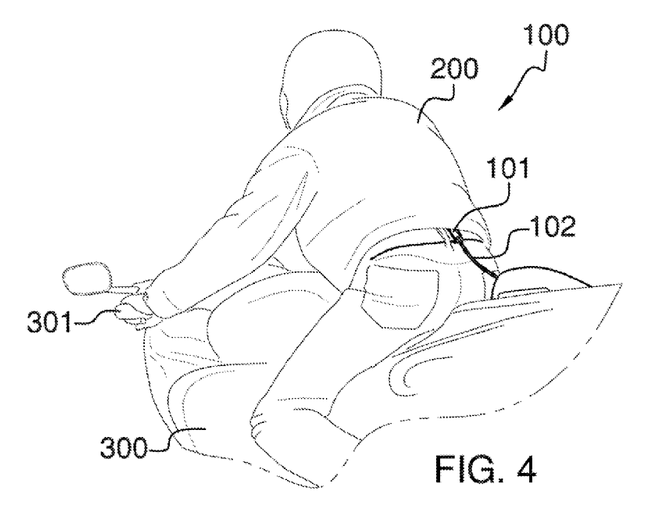
FIG. 4 illustrates a rear view of a motorcyclist harnessed to the self-releasing vehicular harness.
Figure 5:
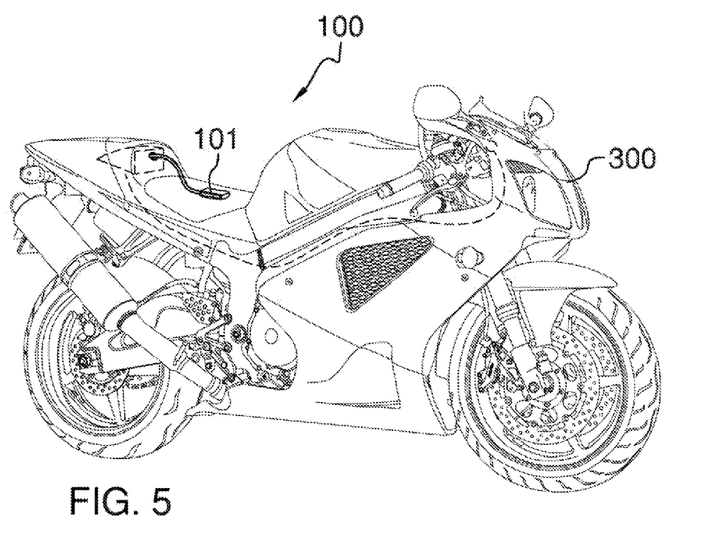
FIG. 5 illustrates a perspective view of the self-releasing vehicular harness integrated into the design of a new motorcycle.
Figure 6:
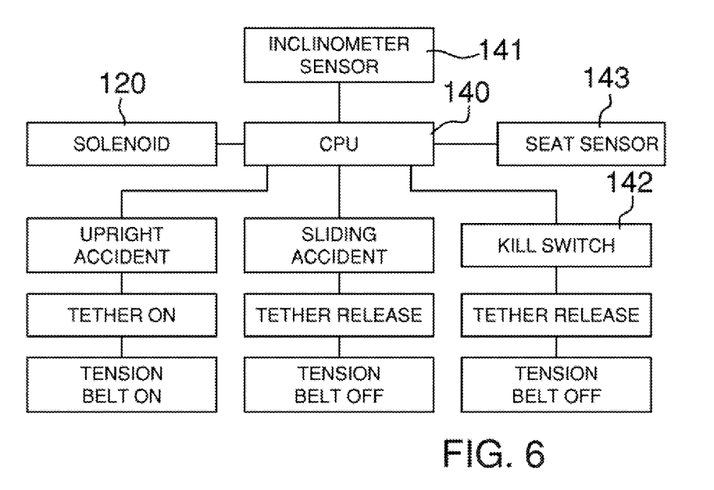
FIG. 6 illustrates a block diagram of the components as well as the different parameters indicating release or lock of the tether.
Figure 7:
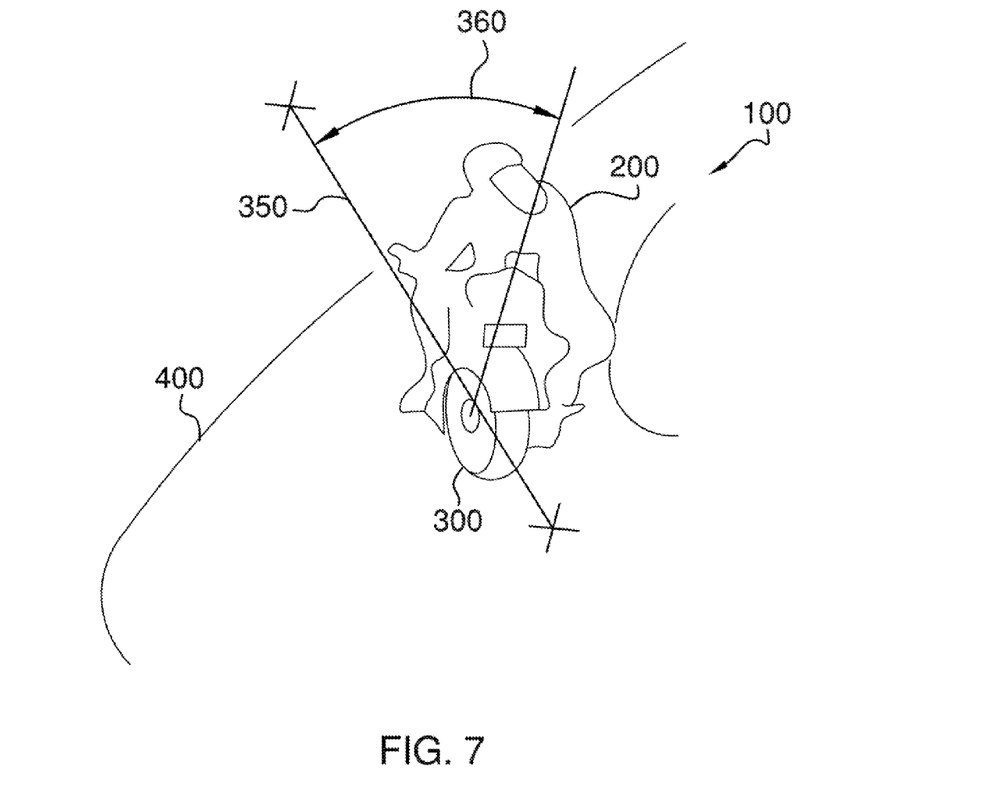
FIG. 7 illustrates a rear view of a motorcycle inclined while turning in order to depict a lateral axis that the inclinometer measures.
Figure 8:
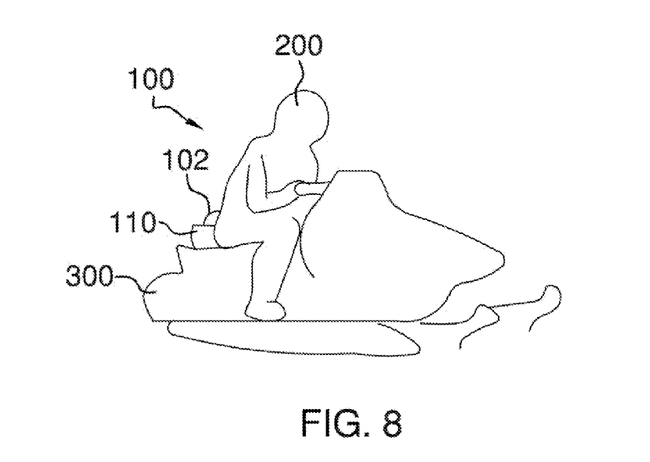
FIG. 8 illustrates a view of the self-releasing vehicular harness integrated for use with a snowmobile.
Figure 9:
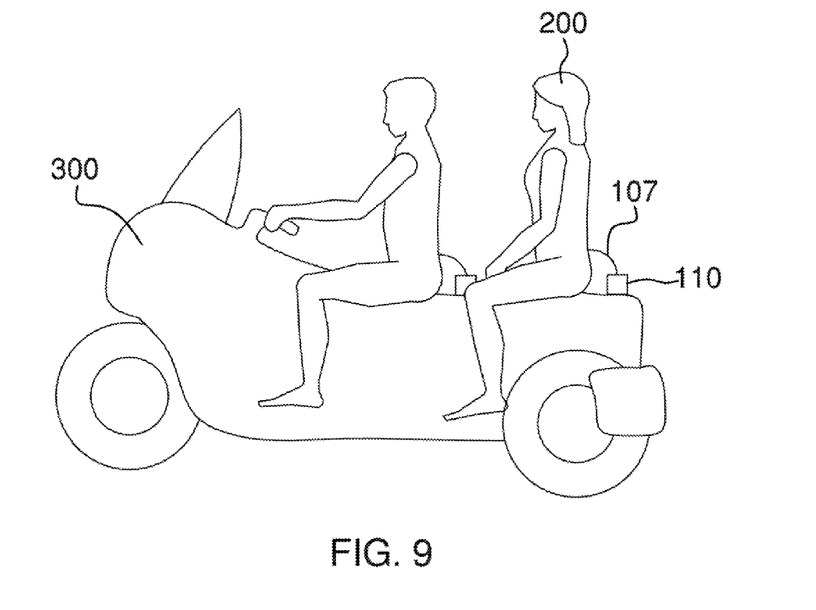
FIG. 9 illustrates a view of the self-releasing vehicular harness integrated into a motorcycle with a rider and a driver.
Figure 10:
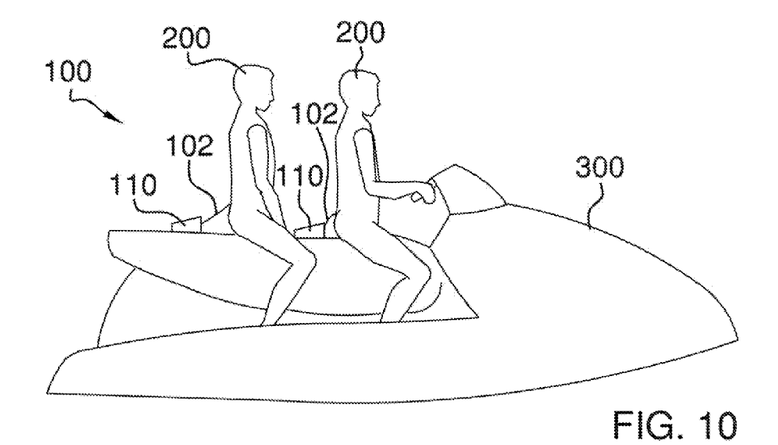
FIG. 10 illustrates a side view of the self-releasing vehicular harness integrated into a jet ski.
Figure 11:
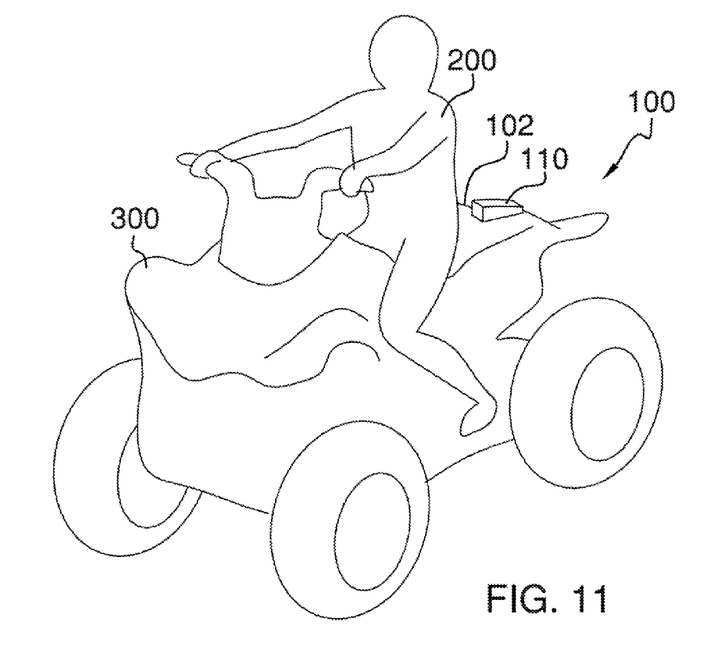
FIG. 11 illustrates a perspective view of the Self-releasing vehicular harness integrated into a four-wheeler.

The invention 100 includes a central processing unit 140 that is in wired communication with the solenoid 120 and an inclinometer 141. The inclinometer 141 is a component of the invention 100 that determines an angle 360 of the vehicle 300 with respect to a ground surface 400. Moreover, the inclinometer 141 determines the angle of the vehicle 300 with respect to a longitudinal and/or lateral plane 350 such that in the event of an accident with the vehicle 300 where the vehicle 300 is sliding or not parallel with the horizon, the tether 102 shall be released in order to enable the end user 200 to become disengaged with the vehicle 300, and not restrained to the vehicle 300 during said type of accident. It shall be noted that the lateral plane 350 is perpendicular with respect to the longitudinal plane. It shall be noted that the angle 360 shall be the amount of lean and/or incline or slope on the vehicle 300 at which point the invention 100 unlocks or releases the tether 102 such that the end user 200 is un-restrained in the event of an accident.

As a side note, the longitudinal plane of a motorcycle is affiliated with the path of travel, and rotation about the longitudinal plane is known as roll. The lateral plane of said motorcycle is perpendicular with the longitudinal plane. Moreover, rotation about the lateral plane is known as pitch.

The invention 100 may further include a kill switch 142 that is in wired communication with the central processing unit 140. The kill switch 142 may be a button located on or adjacent the handlebars 301 of the vehicle 300 such that the end user 200 shall depress the kill switch 142 thereby releasing the tether 102. The kill switch 142 acts as an override for the invention 100.

Figure 12:
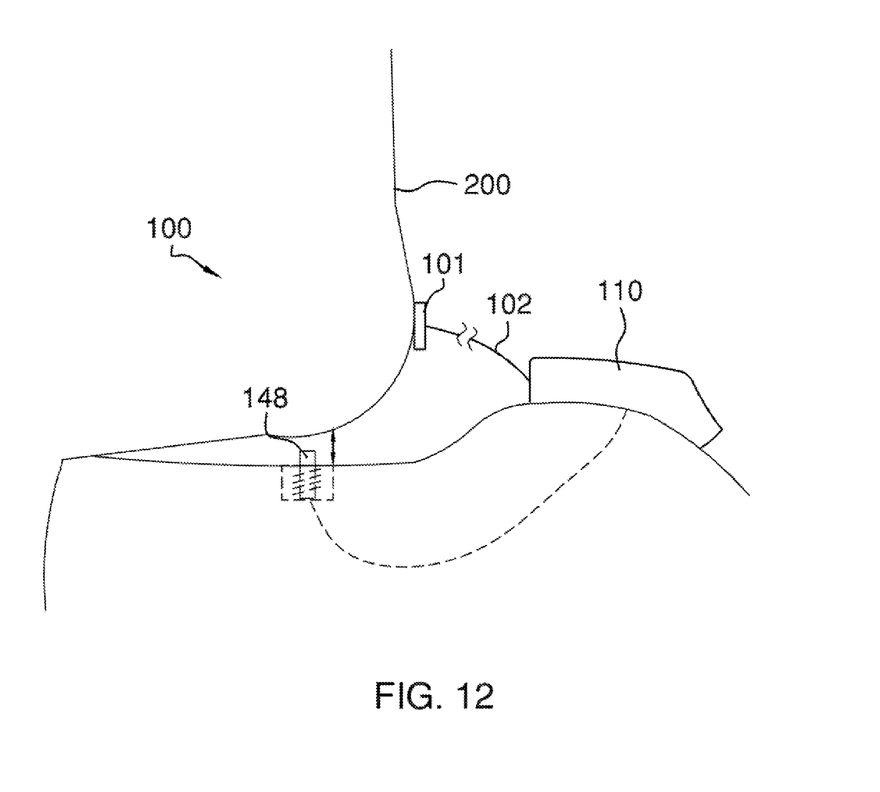
FIG. 12 illustrates a side view of the seat sensor integrated into the motorcycle seat.

Referring to FIG. 12, the invention 100 may further include a seat sensor 143 that is in wired communication with the central processing unit 140. The seat sensor 143 would be used to determine if the end user 200 is physically seated on the seat 302 of the vehicle 300. In the event of an accident with the vehicle 300, if the seat sensor 143 determines that the end user 200 is not seated on the seat 302, then the invention 100 may unlock or release the tether 102. The seat sensor 143 shall be integrated into the construction of the seat 302 of the particular vehicle 300. Moreover, the seat sensor 143 may be spring-loaded and extend upwardly through the seat 302 in order for the end user 200 to sit upon both the seat 302 and the seat sensor 143 thereby signaling the central processing unit as to the detection of the end user 200 on the seat 302.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A self-releasing vehicular harness comprising:
   a harness connected to a tether that is wound upon a spring-loaded drum;
   wherein the spring-loaded drum includes at least one solenoid, which locks or unlocks the spring-loaded drum in order to either restrain or not restrain an end user connected thereto while riding a vehicle;
   wherein the harness and the tether shall prevent said end user from flying over handlebars of said vehicle in an event of a head-on or upright collision with another object or vehicle;
   wherein the spring-loaded drum and the at least one solenoid are contained within a housing that is secured to the vehicle immediately behind or aside of the end user, and from which the tether extends to the harness, which engages said end user from behind or aside;
   wherein the tether is of an undefined length; wherein the tether exits the housing via an opening provided on a surface of the housing that faces the end user;
   wherein the housing is of hollowed construction and contains the at least one solenoid and the spring-loaded drum internally; wherein the at least one solenoid is rotatably engaged with the housing via a hinge positioned there between and inside of the housing.

2. The self-releasing vehicular harness as described in claim 1 wherein a central processing unit is in wired communication with the at least one solenoid and an inclinometer; wherein the inclinometer detects an angle of the vehicle with respect to a ground surface that the vehicle is being driven upon; wherein the inclinometer determines the angle of the vehicle with respect to a lateral and/or a longitudinal plane such that in the event of an accident with the vehicle where the vehicle is sliding or not parallel to the horizon, the tether shall be unlocked in order to enable the end user to become disengaged with the vehicle, and not restrained to the vehicle during said accident.

3. The self-releasing vehicular harness as described in claim 2 wherein a seat sensor is in wired communication with the central processing unit, and is integrated into a seat of the vehicle from which the end user sits upon while operating said vehicle; wherein the seat sensor determines if the end user is physically seated on the seat of the vehicle.

4. The self-releasing vehicular harness as described in claim 2 wherein a kill switch is in wired communication with the central processing unit.

5. The self-releasing vehicular harness as described in claim 4 wherein the kill switch is located on or adjacent the handlebars of the vehicle such that the end user may depress the kill switch thereby releasing the tether.

6. A self-releasing vehicular harness comprising:
   a harness connected to a tether that is wound upon a spring-loaded drum;
   wherein the spring-loaded drum includes at least one solenoid, which locks or unlocks the spring-loaded drum in order to either restrain or not restrain an end user connected thereto while riding a vehicle;
   wherein the harness and the tether shall prevent said end user from flying over handlebars of said vehicle in an event of a head-on or upright collision with another object or vehicle;
   wherein the spring-loaded drum and the at least one solenoid are contained within a housing that is secured to the vehicle immediately behind or aside of the end user, and from which the tether extends to the harness, which engages said end user from behind or aside;

wherein the tether is of an undefined length; wherein the tether exits the housing via an opening provided on a surface of the housing that faces the end user;

wherein the housing is of hollowed construction and contains the at least one solenoid and the spring-loaded drum internally; wherein the at least one solenoid is rotatably engaged with the housing via a hinge positioned there between and inside of the housing.

7. The self-releasing vehicular harness as described in claim 6 wherein a central processing unit is in wired communication with the at least one solenoid and an inclinometer; wherein the inclinometer detects an angle of the vehicle with respect to a ground surface that the vehicle is being driven upon; wherein the inclinometer determines the angle of the vehicle with respect to a lateral and/or a longitudinal plane such that in the event of an accident with the vehicle where the vehicle is sliding or not parallel with the horizon, the tether shall be unlocked in order to enable the end user to become disengaged with the vehicle, and not restrained to the vehicle during said accident.

8. The self-releasing vehicular harness as described in claim 7 wherein a kill switch is in wired communication with the central processing unit.

9. The self-releasing vehicular harness described in claim 8 wherein the kill switch is located on or adjacent the handlebars of the vehicle such that the end user may depress the kill switch thereby releasing the tether.

10. The self-releasing vehicular harness as described in claim 8 wherein a seat sensor is in wired communication with the central processing unit, and is integrated into a seat of the vehicle from which the end user sits upon while operating said vehicle; wherein the seat sensor determines if the end user is physically seated on the seat of the vehicle.

11. A self-releasing vehicular harness comprising:

a harness connected to a tether that is wound upon a spring-loaded drum;

wherein the spring-loaded drum includes at least one solenoid, which locks or unlocks the spring-loaded drum in order to either restrain or not restrain an end user connected thereto while riding a vehicle;

wherein the harness and the tether shall prevent said end user from flying over handlebars of said vehicle in an event of a head-on or upright collision with another object or vehicle;

wherein the spring-loaded drum and the at least one solenoid are contained within a housing that is secured to the vehicle immediately behind or aside of the end user, and from which the tether extends to the harness, which engages said end user from behind or aside;

wherein the tether is of an undefined length; wherein the tether exits the housing via an opening provided on a surface of the housing that faces the end user;

wherein a central processing unit is in wired communication with the at least one solenoid and an inclinometer; wherein the inclinometer detects an angle of the vehicle with respect to a ground surface that the vehicle is being driven upon; wherein the inclinometer determines the angle of the vehicle with respect to a lateral and/or a longitudinal plane such that in an event of an accident with the vehicle where the vehicle is sliding or not parallel to a horizon, the tether shall be unlocked in order to enable the end user to become disengaged with the vehicle, and not restrained to the vehicle during said accident;

wherein a kill switch is in wired communication with the central processing unit;

wherein the housing is of hollowed construction and contains the at least one solenoid and the spring-loaded drum internally; wherein the at least one solenoid is rotatably engaged with the housing via a hinge positioned there between and inside of the housing;

wherein the kill switch is located on or adjacent the handlebars of the vehicle such that the end user may depress the kill switch thereby releasing the tether;

wherein a seat sensor is in wired communication with the central processing unit, and is integrated into a seat of the vehicle from which the end user sits upon while operating said vehicle; wherein the seat sensor determines if the end user is physically seated on the seat of the vehicle.

* * * * *